United States Patent [19]
Durling

[11] 3,929,381
[45] Dec. 30, 1975

[54] PNEUMATIC BRAKE SYSTEM FOR A TRACTOR-TRAILER VEHICLE INCLUDING AN ANTI-LOCK CONTROL VALVE IN THE TRAILER BRAKE SYSTEM

[75] Inventor: Harold Durling, Elsie, Mich.

[73] Assignee: Midland-Ross Corporation, Cleveland, Ohio

[22] Filed: Mar. 11, 1974

[21] Appl. No.: 449,730

[52] U.S. Cl. .................. 303/21 F; 303/7; 303/9; 303/13; 303/40
[51] Int. Cl.² ................. B60T 8/06; B60T 15/16
[58] Field of Search ......... 303/13, 9, 7, 2, 40, 21 F, 303/61–63, 68–69; 188/3, 181 A

[56] References Cited
UNITED STATES PATENTS

| | | | |
|---|---|---|---|
| 2,985,489 | 5/1961 | Stelzer | 303/7 X |
| 3,107,126 | 10/1963 | Valentine | 303/13 |
| 3,115,371 | 12/1963 | Valentine | 303/9 X |
| 3,228,730 | 1/1966 | Schubert | 303/7 |
| 3,285,672 | 11/1966 | Avrea | 303/9 |
| 3,304,131 | 2/1967 | Bueler | 303/13 |
| 3,536,363 | 10/1970 | Ravenel | 303/21 F |
| 3,765,729 | 10/1973 | Toomey | 303/13 |
| 3,796,468 | 3/1974 | Morse et al. | 303/40 X |

Primary Examiner—Trygve M. Blix
Assistant Examiner—Douglas C. Butler
Attorney, Agent, or Firm—Frank J. Nawalanic

[57] ABSTRACT

A pneumatic brake system is provided for tractor-trailer vehicles which permits air to be supplied to the trailer while both tractor and trailer brakes remain set when the rig is parked thereby permitting associated pneumatic devices to be operated with the rig braked. The system includes a park valve which, by itself, is operable to always set the tractor-trailer brakes when the vehicle is parked and release same when the vehicle is to be driven. A control valve is provided in the system which, when optionally operated, supplies air to the trailer while a series of automatically acting valves respond to the position of the control and park valves to maintain the tractor parking brakes and trailer service brakes set during trailer fill operation.

3 Claims, 5 Drawing Figures

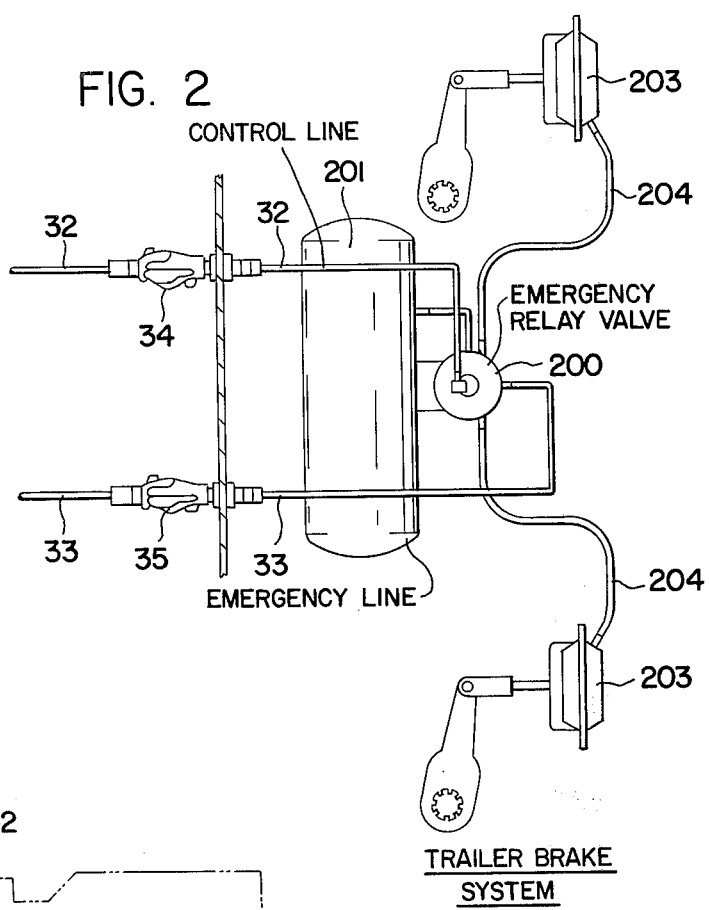
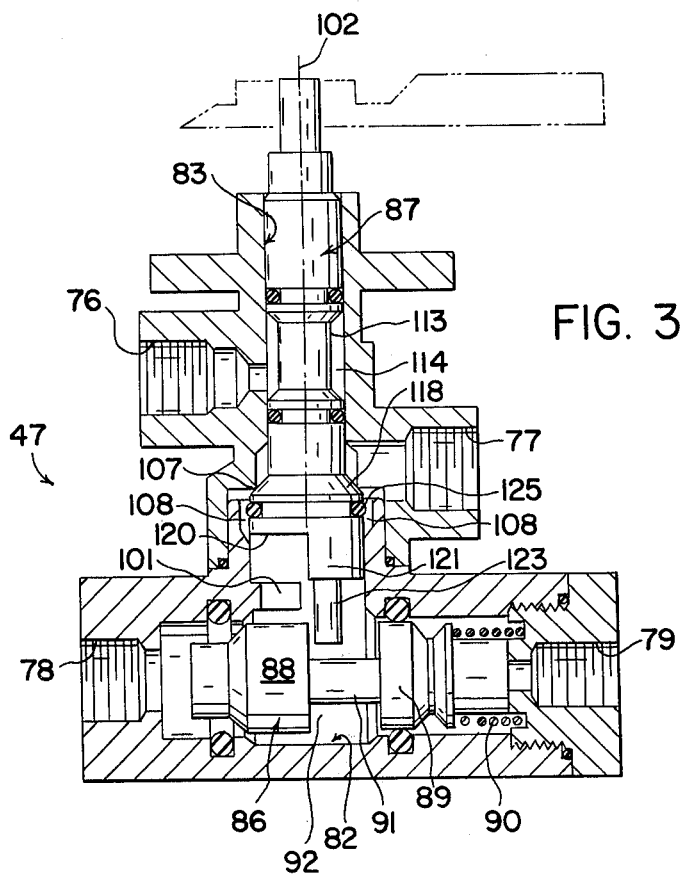

PNEUMATIC BRAKE SYSTEM FOR A TRACTOR-TRAILER VEHICLE INCLUDING AN ANTI-LOCK CONTROL VALVE IN THE TRAILER BRAKE SYSTEM

This invention relates generally to a pneumatic brake system and more particularly to such a system as it relates to the braking of a tractor-trailer vehicle in parked and unparked positions.

The invention is particularly applicable to positive air pressure brake systems used on tractor-trailer rigs and will be described with particular reference thereto. However, it will be appreciated by those skilled in the art that the invention has broader application and may be applied in negative pressure (vacuum) brake systems.

Vehicles in interstate commerce have become widely equipped with spring-set brake actuators to automatically insure, in a failsafe manner, braking of the rig if failure occurs in the air brake system. Recent regulations have also required that the brakes of both tractor and trailer be set and released from their set position by a single valve when the rig is parked and released from its parked position. Several systems meeting these regulations have been promoted and are in use today. One deficiency of at least one system in use today is that air pressure cannot be supplied to the trailer unless the tractor and trailer brakes are released. Thus, air operated devices such as tailgate lifts which are actuated by compressed air from the trailer air brake system cannot be operated. To overcome this deficiency, certain brake arrangements have been employed which do permit air to be supplied to the trailer while the rig remains parked. However, in each of these installations the trailer brakes must be released while the tractor spring-set parking brakes remain set for braking the rig. Such systems have not been acceptable for some special purpose tractor-trailer combinations which require that both tractor and trailer brakes remain set while air operated devices on the trailer are used.

It is thus an object of the subject invention to provide a braking system on tractor-trailer combinations using spring-set brake actuators on the tractor which permit tractor parking and trailer service brakes to be set while a source of pressurized fluid is supplied to the trailer.

This object along with other features of the subject invention is achieved in a braking system which employs spring-set brake actuators on the tractor, either a conventional trailer brake system utilizing an emergency relay valve or a newer trailer brake system employing antilock controlled service brake and spring-set parking brakes. A conventional source of fluid at "supply" and "signal" pressures is supplied by the tractor and delivered to a unique valve arrangement within the tractor brake system. The valve arrangement includes a manually operable park valve having an applied or brake position which vents supply line pressures to tractor brake actuators and trailer supply line to set tractor and trailer brakes and restores supply line pressures to the tractor actuators and trailer system to release the brakes. Operatively associated with the park control valve is an air control valve which is optionally operable to a fill position. Associated with the park valve and the air control valve are several valves which automatically react in a predetermined sequence to the position of the air control valve and the park valve.

More specifically, with the park valve in an applied position and the air control valve in a fill position, the automatic valves provide certain fluid communication paths with the trailer arrangement whereby supply pressure is directed to the service line of the trailer system to maintain the trailer brakes in an applied position while the trailer system is pressurized.

In accordance with another feature of the subject invention, the afore-mentioned automatic valve mechanisms and air control valve automatically react to movement of the park valve from its applied to released position to simultaneously release both tractor and trailer brakes. Release of tractor and trailer brakes occurs even if the air control valve was not previously placed in its fill position. Additionally, the valve structure is sequenced to provide all normal braking functions heretofore required in braking systems in a manner which is characterized as being failsafe and foolproof.

It is thus another object of the subject invention to provide a pneumatic vehicle brake system which requires only one valve to permanently set and release tractor-trailer brakes when the vehicle is to be parked and moved from its parked position.

Yet another object of the subject invention is to provide a valve sequence arrangement which accomplishes not only the features of the afore-mentioned objects but also provides for all other braking functions required in such systems in a failsafe and foolproof manner.

The invention may take physical form in certain parts and arrangement of parts, a preferred embodiment of which will be described in detail herein and illustrated in the accompanying drawings which form a part hereof and wherein:

FIG. 2 is a schematic illustration of an alternative, but conventional, trailer brake system;

FIG. 3 is a sectioned elevation view of the air control valve employed in the subject invention.

Figure 1:
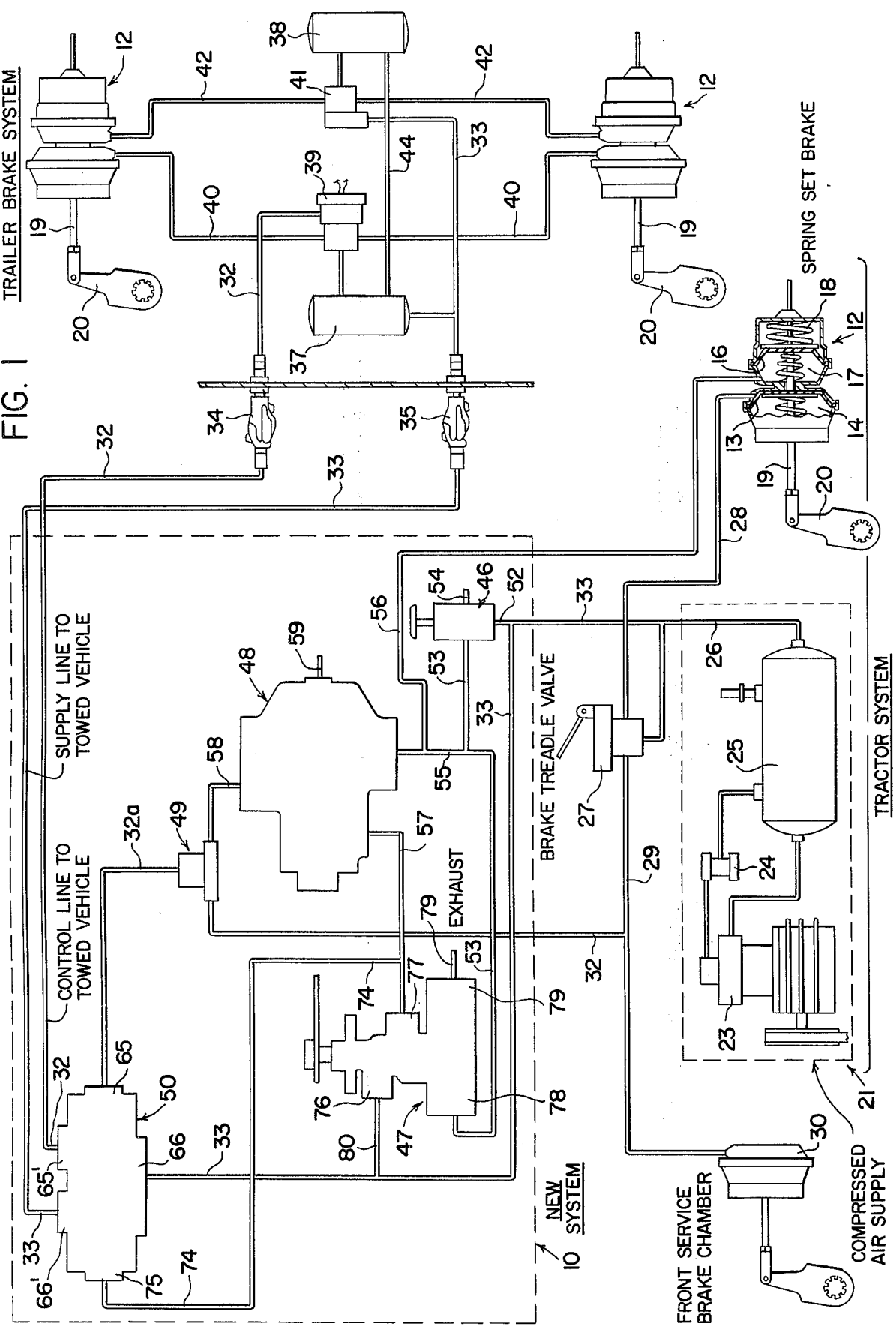
FIG. 1 is a schematic diagram of the brake system of the subject invention.

Referring now to the drawings wherein the showings are for the purpose of illustrating a preferred embodiment of the invention only and not for the purpose of limiting same, FIG. 1 illustrates generally a brake arrangement for a tractor-trailer vehicle including a tractor brake system and a trailer brake system, as designated, which are adapted to be coupled to one another. Shown within dot-dash envelope 10 in the tractor brake system is the specific valve arrangement of the subject invention.

The rear brakes of the tractor are shown to be spring-set actuators 12 of a known dual diaphragm type and will not be described in detail herein. Briefly, each spring-set actuator 12 comprises a first diaphragm 13 defining a service brake chamber 14 and a second diaphragm 16 defining an emergency brake chamber 17. Biased against second diaphragm 16 is a compression spring 18 stored at one end of the actuator. A push rod 19 extends from each actuator and in an extended position applies the brakes of a vehicle (not shown) by a known slack adjuster mechanism 20. Spring-set actuators 12 are operated during normal use of the tractor-trailer by admitting air at signal pressure into service brake chamber 14 which acts against first diaphragm 13 to extend push rod 19. Also during normal operation, air is admitted at supply pressure into emergency brake chamber 17 which forces second diaphragm 16 against spring 18 to maintain that spring in a compressed position. When air is vented from emergency brake chamber 17, such as when the vehicle is parked or when an air failure occurs, spring 18 extends push rod 19 to set the brakes.

A source of compressed air for activating the brake actuators is supplied by the components shown within dotted envelope 21. Such components include, generally speaking, a compressor 23 driven by the tractor engine to supply air at a given pressure, controlled by governor 24, into a reservoir arrangement indicated generally at 25. Reservoir 25 is capable of maintaining air supplies at supply or "emergency" pressure for brake system purposes which are associated with such terms as known in the art. An outlet line 26 from reservoir 25 communicates air at supply pressure to a known treadle valve 27 which in turn communicates air at signal or "control" pressure to service brake chambers 14 of the spring-set actuators at the rear of the tractor by line 28 and similarly communicates control pressure by line 29 to the tractor's front brake actuators 30 which are of the normal air operated, single diaphragm type. (Signal or control pressures are terms known in the art for applying varying pressures to effect braking of the vehicle during normal operation and are used in that sense herein.) Depressing treadle 27 varying degrees admits air at corresponding pressures into service brake chambers 14 of rear tractor actuators 12 and front tractor actuators 30 via lines 28, 29 respectively and release of the treadle permits air flow to reverse its direction and vent through treadle valve 27. In communication with line 29, as by a suitable T-connection, is a signal line 32 and upstream of treadle valve 27 in communication with line 26 is a supply line 33. Signal and supply lines 32, 33 lead into valve system envelope 10 of the subject invention and extend out therefrom to the trailer system through suitable connections 34, 35 which comprise coupling means for coupling the trailer system to the tractor system.

The trailer brake systems shown in FIGS. 1 and 2 are representative of typical trailer systems and show typical trailer valve arrangements. In FIG. 1, an antiskid trailer brake system utilizing spring-set, dual diaphragm actuators 12 is illustrated. More particularly, the trailer supply line communicates with a primary reservoir 37 associated with the service brake chamber of the spring-set actuator 12. Air at supply pressure is also communicated to a secondary reservoir 38 through line 44; secondary reservoir 38 being associated with the emergency brake chamber of trailer spring-set actuators 12. Air at signal pressure in signal line 32 is in fluid communication with a known antilock valve 39. Antilock valve 39 functions in a known manner in accordance with signals generated from a wheel speed skid indicator system (not shown) to port air at modulated or unmodulated signal pressure through line 40 to the service brake chambers of spring-set actuators 12. Air at supply pressure in line 33 is communicated to a known relay-type valve 41 which in its normal operating position permits air at supply pressure from secondary reservoir 38 to be in fluid communication through lines 42 to emergency brake chambers of the spring-set actuators 12 and thus maintain actuator springs in a compressed position. When a drop in pressure occurs in supply line 33, relay valve 41 will vent air in lines 42 and the emergency brake chamber of the spring-set actuators. This will permit the springs to set the brakes on the trailer vehicle. Upon restoration of supply pressure in line 33, relay valve 41 delivers air from reservoir 38 to the emergency brake chambers of the spring-set actuators, releasing same. In FIG. 2, a second type of conventional trailer brake system is illustrated. In the system shown in FIG. 2, the trailer brake actuators 203 illustrated are of the known single diaphragm, air apply type. The system more particularly includes an emergency relay valve 200 which is connected to signal and supply lines 32, 33, a reservoir 201 and trailer brake actuators 203 connected to relay valve 200 through suitable line 204. Emergency relay valve 200 functions in the usual manner to admit reservoir air at signal pressures to brake actuators 203 when treadle valve 27 is depressed and vent same when the treadle is released. Similarly, in the event of a predetermined pressure drop in supply line 33, emergency relay valve 200 is actuated to supply air at supply pressure from reservoir 201 to trailer brake actuators 203 to set the brakes. When supply pressure is restored in line 33, emergency relay valve 200 vents the air at trailer brake actuators 203 to re-establish normal operating mode of the trailer brake system.

The valve arrangement shown within dotted envelope 10 controls the air supplied from source 21 and treadle valve 27 and admits same to the trailer brake system while also controlling air at supply pressure to emergency chambers 17 of the tractor brake actuators 12. This arrangement includes a park control valve 46, an air control valve 47 and automatically reacting valve means associated with park valve 46 and air control valve 47. The automatic valve means includes a normally open/pilot closed valve 48, a two-way check valve 49 and a pilot operated, tractor protector valve 50. All valves designated, with the exception of air control valve 47, are known in the art and thus will not be described or explained in detail herein. Air control valve 47 by itself and in a conventional tractor brake system comprises the subject matter of a copending application identified by U.S. Ser. No. 449,707, filing date Mar. 11, 1974 by H. Durling and assigned to the assignee herein. Reference may be had to that application for a detailed description of the operation and structure of air control valve 47.

Park valve 46 has an inlet line 52 "T'd" to supply line 33 and an outlet in fluid communication with line 53 and a vent 54. Park valve 46 is manually operable in the usual push-pull manner between an applied position which vents line 53 to atmosphere through vent 54 and a released position which communicates line 53 with line 52 to provide air at supply pressure in line 53. In communication with line 53 is a line 55 which leads to normally open/pilot closed valve 48 and T'd to line 55 is a line 56 which communicates with emergency brake chamber 17 of truck brake actuators 12.

Figure 4:
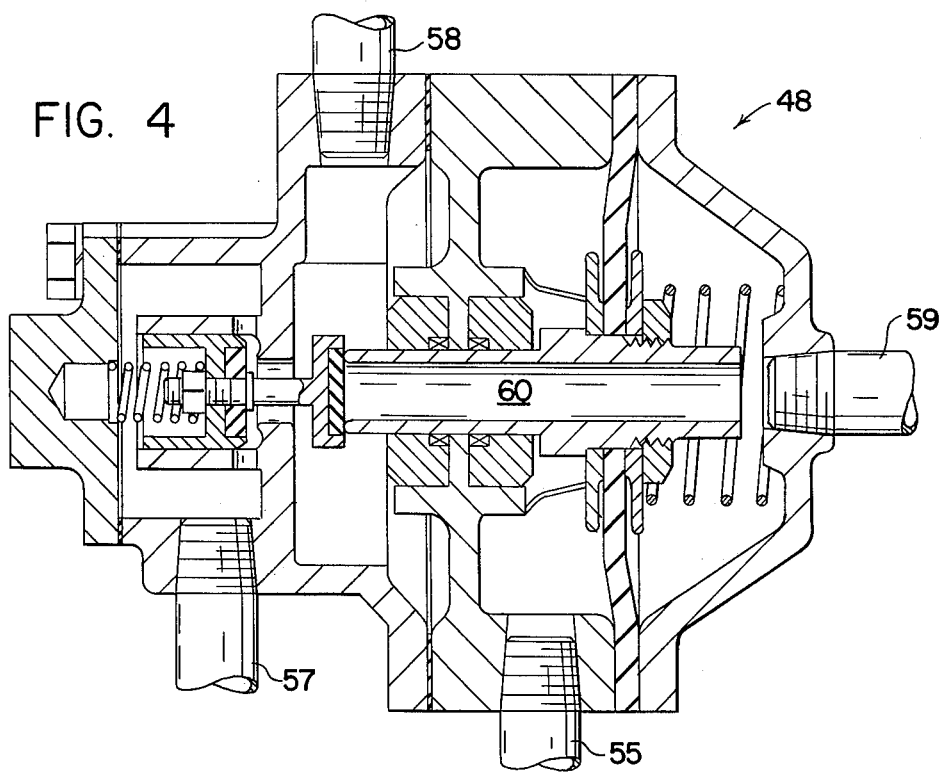
FIGS. 4 and 5 are section views of two different valves employed in the brake system.

As shown in FIG. 4, normally open/pilot closed valve 48 has a pilot inlet port in fluid communication with line 55, a main inlet port in fluid communication with a line 57, an outlet port in communication with a line 58 and a vent 59. When air at supply pressure is applied to the pilot inlet port of valve 48 through line 55, valve plunger 60 therein seals main inlet (line 57) and vents line 58 to atmosphere via communication with vent 59. If pressure in line 55 is reduced to atmosphere and pressure above atmosphere exists in line 57, plunger 60 will move in the opposite direction to provide fluid communication between line 57 and line 58.

Outlet line 58 from normally open/pilot closed valve 48 communicates with one of the inlets in two-way check valve 49. The other inlet in two-way check valve 49 is in fluid communication with signal line 32. Two-way check valve functions in its normal expected manner and will communicate its outlet 32a with whichever of inlet lines 58, 32 is at highest pressure. Outlet line 32a of check valve 49 communicates with signal inlet port 65 of tractor protector valve 50.

Figure 5:
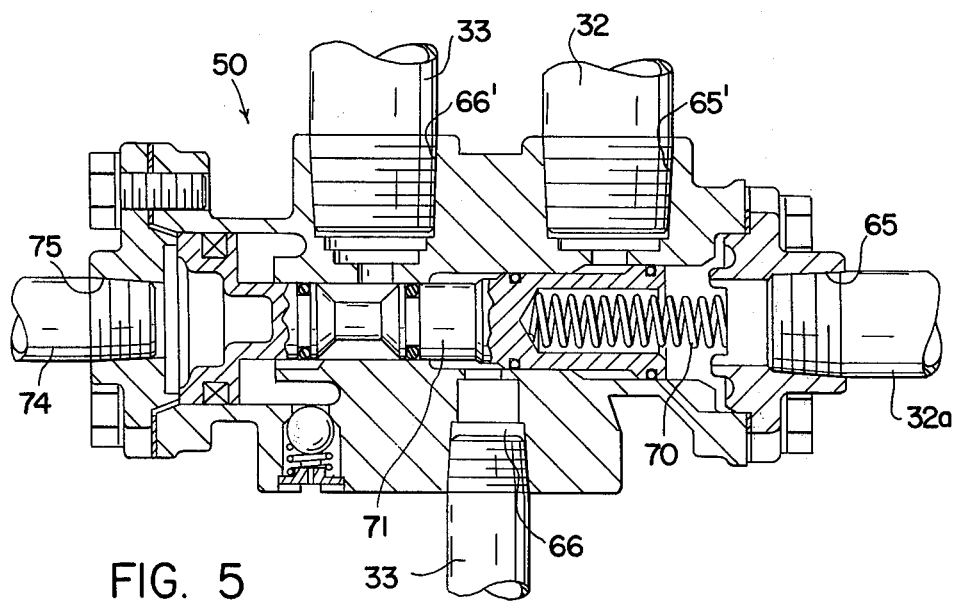

Tractor protector valve 50 (FIG. 5) has a supply inlet port 66 in fluid communication with supply line 33 and a signal inlet port 65 in fluid communication with line 32a. Tractor protector valve likewise has a signal outlet port 65' connected to signal line 32 leading to the trailer system and a supply outlet port 66' connected to supply line 33 leading to the trailer brake system. The valve shown is basically a spool-sleeve valve with a spring 70 biasing a spool 71 out of communication with inlet-outlet ports 65, 66, 65', 66' to vent trailer supply line 33 on the downstream side of the valve to atmosphere. Spool 71 is normally positioned to provide fluid communication between its inlet and outlet ports by supply pressure which normally exists in a line 74 which communicates with a pilot inlet port 75 on tractor protector valve 50. Line 74 is shown in fluid communication with line 57 and leads to a second port 77 on the outlet side of air control valve 47.

Air control valve 47 as shown in FIGS. 1 and 3 more specifically includes:

1. a first port 76 on the inlet side of the valve in fluid communication with a line 80 in turn in communication with supply line 33;
2. a second port 77 on the outlet side of the valve and in fluid communication with line 74 as previously mentioned;
3. a third port 78 on the inlet side of the valve in fluid communication with line 53 and being on the downstream side of park valve 46 is at supply pressure when park valve 46 is in its released position; and
4. a fourth port 79 on the outlet side of the valve vented to atmosphere.

Air control valve 47 is either manually or automatically operated to establish several different operating modes which are either necessary or desirable to tractor-trailer brake systems. These modes may be defined as "normal operation", "failsafe", "park", "fill" and "bobtail". Fluid communication paths between valve ports 76–79 and each of these valve modes may best be set forth in tabulated form as shown below:

TABLE I

| Operating Mode | 1st Port | 2nd Port | 3rd Port | 4th Port |
|---|---|---|---|---|
| Normal Highway (with trailer) | Sealed | X | X | Sealed |
| Failsafe (automatic) (with trailer) | Sealed | X | Sealed | X |
| Park (with trailer) | Sealed | X | Sealed | X |
| Fill (with trailer) | X | X | Sealed | Sealed |
| Bobtail (manual lock) (without trailer) | Sealed | X | Sealed | X |

"X" indicates fluid communication therebetween.

The structure of air control valve 47 which permits these various flow paths to be obtained is shown in FIG. 3 with the valve position illustrated being its normal highway operating mode. Briefly, this valve structure includes a valve body having a first valve cavity 82 in fluid communication with third and fourth ports 78, 79 and also in fluid communication with a second valve cavity 83; second valve cavity 83 being in fluid communication with first and second ports 76, 77. Disposed within first cavity 82 is a first plunger 86 and disposed within second cavity 83 is a second plunger 87. First plunger 86 has a first slider-piston 88 and is normally biased as by springs 90 into its first position whereby first slider-piston 88 seals third port 78 from communicating with fourth port 79 or second cavity 83. At the opposite end of first plunger 86 is a second slider-piston 89 which, in the second position of first plunger 86, seals fourth port 79 when third port 78 is pressurized. First and second slider-pistons 88, 89 are connected by a connecting member 91 to define a gap 92 therebetween.

Second cavity 83 is especially configured to have a stop defined by a bottom shelf 101 formed as a segmented ring and a top stop defined by an annular shoulder 107. In between stops 101, 107 is a plurality of circumferentially spaced flutes 108 cut into first cavity 83 and communicating at their open upper end with second port 77. As clearly shown in FIG. 3, the bottom portion of second cavity 83 is larger than top portion and second plunger 87 which is received within second cavity 83 is cylindrically stepped in configuration to be received therein. More particularly, second plunger 87 is recessed as at 113 to define an area 114 in fluid communication with first port 76 and sealed therefrom by appropriate seals as shown. The bottom larger diameter portion of second plunger 87 has a frusto-conical surface 118 adapted to contact second stop 107 and a generally flat bottom surface 120 adapted to seat on first stop 101 when second plunger 87 is manually moved downwardly to its fill mode position. Depending from bottom surface 120 is a semicircular boss 121 which is positioned at one side of second plunger's centerline 102 and depending from boss 121 is an eccentrically mounted actuating lever 123 which extends into gap 92. When the valve is rotated to its bobtail mode, the bottom of boss 121 rests on shelf 101 and eccentric actuating lever 123 locks first slider-piston 88 into contact with port 78 thereby locking first plunger 86 in its first position. It should also be noted that whenever second plunger 87 contacts second stop 107, fluid communication is provided between second port 77 and one of the third or fourth ports 78, 79. When second plunger is displaced axially downward to rest against shelf 101, seal 125 on second plunger 87 acts to prevent fluid communication between first and second cavities 82, 83.

In operation, the brake system disclosed will operate in accordance with the operating modes listed above in Table I.

More specifically, the normal operating highway mode occurs with the trailer coupled to the tractor and park valve 46 in its released position to supply air at supply pressure in line 53. Supply pressure is thus communicated from line 53 through lines 55 and 56 to emergency brake chambers 17 maintaining actuator spring 18 compressed. Supply pressure in line 53 simultaneously enters third port 78 of air control valve 47, to move first plunger 86 into its second position and bias second plunger 87 upwardly into the position shown in FIG. 3. This seals first port 76 and fourth port 79, and communicates third port 78 with second port 77. Supply pressure is thus communicated to pilot line 74 raising spool 71 in tractor protector valve 50 to provide fluid communication between inlet and outlets 65, 66, 65', 66'. Normally open/pilot closed valve 48 receives supply pressure in line 55 at its pilot inlet port to move plunger 60 rearward thus venting line 58 to atmosphere. Thus check valve 49 is sensitive to control line pressure in line 32 downstream thereof and control line pressure is thus communicated through tractor protector valve 50 to the trailer brake system. Similarly, supply pressure in line 33 is communicated to the trailer brake system and the trailer brake system is thus placed in its normal operating mode as defined hereinbefore.

The brake system 10 automatically shifts to a failsafe mode if a loss of pressure should occur in the trailer air system as, for example, if the trailer or towed vehicle should break away or if any other serious leak should develop. Such leakage would drop supply line pressure in line 33 which would similarly drop pressure in line 53. This pressure drop would automatically shift control valve 47 into its failsafe mode when the pressure is reduced to a value below that of the compression of springs 90. In such instance, first plunger 86 will shift to its first position to seal port 78 and provide communication between its second port 77 with atmosphere via fourth port 79. This will vent line 74 causing spool 71 in tractor protector valve 50 to drop, thus preventing fluid communication between spool inlets and outlets 65, 66, 65', 66' and venting 66' to the atmosphere. Normally open/pilot closed valve 48 and double check valve 49 have no influence on this reaction.

When the tractor is to be driven not coupled to a trailer, the air control valve is manually placed in its bobtail operating mode. This mode occurs when the second plunger 87 is rotated to force the first plunger 86 into its first position to provide identical fluid flow paths as if the valve were in its failsafe position. As described above, this will place the inlet and outlet lines of tractor protector valve 50 out of communication with one another.

Reverting back now to tractor-trailer operation, the rig is parked in compliance with federal regulations by simply placing park valve 46 in its applied position. When this occurs, supply line pressure is still communicated in line 33 to supply inlet 66 of tractor protector valve 50. However, line 53 downstream of park valve 46 is vented to atmosphere through park valve vent 54. This also vents supply pressure in lines 55 and 56; venting of line 56 allowing expansion of tractor actuator springs 18 to set the rear axle brakes on the tractor. As in the failsafe mode described above, decrease in pressure in line 53 below a predetermined value will automatically result in movement of first plunger 86 to its first position to vent line 74 through second port 77 to atmosphere via port 79. This will cause spool 71 in tractor protector valve 50 to drop to prevent fluid communication between inlets and outlets thereof and vent 66' to atmosphere. When the trailer brake systems illustrated sense a drop in supply line pressure, the systems will automatically cycle to their emergency or park position to set the brakes of the trailer as previously described.

With the tractor-trailer rig thus parked, the tractor-trailer actuators may be released simply by moving park valve 46 to its released position. This will automatically reposition air control valve 47 into its normal highway operating position once the force on springs 90 is overcome by pressure in third port 78 and the system will function with fluid communication as defined above in the normal operating highway mode.

This will, of course, recycle the trailer brake systems into their normal operating position. Importantly, this method of releasing the park brakes on the tractor-trailer vehicle does not permit the trailer air reservoir to fill prior to releasing the tractor and trailer brake actuators.

If it is desired to supply air to the trailer reservoir(s) with tractor and trailer brakes set so that auxiliary air operated equipment on the trailer such as material handling equipment, tailgate lifts, etc. may be used, then control valve 47 must be placed in its fill position. That is, with park valve 46 in its applied position and lines 53, 55 and 56 vented, the second plunger 87 on air control valve 47 is moved downwardly until its base surface 120 contacts first stop 101. In this fill position of the valve, air at supply pressure in line 33 is communicated to first port 76 via line 80 and thence through the valve to second port 77. Supply pressure thus exists in line 75 and line 57 and spool 71 of tractor protector valve 50 is placed in normal communication with its inlets and outlets 65, 66, 65', 66'. Normally open/pilot closed valve 48 automatically responds to supply pressure in line 57 and atmosphere pressure in line 55 to move plunger 60 and provide fluid communication between lines 57 and 58. Line 58 is thus at full supply pressure and forces two-way check valve 49 to shift, independent of treadle valve 27 position, and communicates supply line pressure in line 32a to the trailer brake system through tractor protector valve 50. As noted above, supply line pressure always exists in supply line 33 and is thus communicated with the trailer brake system when tractor protector valve 50 is open. In either trailer brake system, introduction of supply pressure in supply line 33 will cause the trailer system to automatically shift from its emergency or park position to its normal operating position.

In the conventional trailer brake system illustrated in FIG. 2, emergency relay valve 200 will vent air pressure from trailer brake actuators 203 when air control valve 47 is placed in its fill position. This would normally release the brakes in single diaphragm actuator 203. However, since the signal line pressure builds to supply pressure (i.e., 90 to 110 psi.) trailer actuators 203 will be accordingly reapplied. When reservoir 201 is at supply pressure, trailer actuator 203 will be fully extended to lock the trailer brakes while the air within the trailer brake system can be utilized to actuate air operated devices on the trailer. When it is desired to release the brakes, actuation of park valve 46 to its released position vents supply pressure in control lines 32, 32a through normally open/pilot closed valve 48.

The trailer brake system shown in FIG. 1 operates in a similar manner with the added advantage that the use of dual diaphragm, spring-set actuators 12 thereon permit the trailer brakes always to remain applied when air control valve 47 is placed in its fill position. When this occurs, air begins to charge reservoirs 37, 38 via supply line 33 while air at the same pressure enters actuator service brake chambers 14 via signal line 32, antilock valve 39 and line 40. As supply line pressure builds to its system pressure (i.e., 90 to 110 psi.) to accordingly charge reservoirs 37, 38, the compression spring force of the trailer actuators 12 are simultaneously diminished as the pressure builds in actuator emergency chambers 17. This lessening of the spring force is exactly compensated for by the buildup of pressure in the actuator service chambers 14. The net result is that the trailer brake actuators remain in an applied position and when full supply pressure is reached at the trailer system, the brakes will be set by full extension of the service brake diaphragms 13 on the trailer actuators. When it is desired to release the brakes, all that is required, in accordance with federal regulations, is to manually place park valve 46 in its released position. When this occurs, lines 53, 55, 56 will be pressurized, releasing the tractor parking brakes, and control valve 47 will automatically shift, because of unequal pressure areas acting on the second plunger, to its normal highway operating mode. Pressurization of line 55 likewise causes normal open/pilot closed valve 48 to vent line 58 to atmosphere through vent 59. Because tractor protector valve 50 remains in its open position communicating inlets with outlets, the supply pressure in control lines 32, 32a is vented through two-way check valve 49 and line 58 to atmosphere via normally open/pilot closed valve 48 releasing the trailer service brakes.

The invention has been described with reference to a preferred embodiment. Obviously, modifications and alterations will occur to others upon reading and understanding the specification. It is my intention to include all such modifications and alterations insofar as they come within the scope of the present invention.

It is thus the essence of the invention to provide a pneumatic vehicle brake system for a tractor-trailer combination which sets and releases tractor and trailer brakes by means of a single park valve while a second control valve and automatic valve mechanisms responding to the position of the control valve enable the trailer air supply to fill while tractor and trailer brakes remain applied.

Having thus defined the invention, I claim:

1. A vehicle brake system for braking a tractor coupled to a towed trailer by means of a source of fluid supplied to said system under supply and variable signal pressures, said trailer adapted to be equipped with associated, fluid-operated devices, said system comprising:
   a plurality of spring-set brake actuators on said tractor and trailer, each actuator having a first chamber operable by said source under signal pressure to normally brake said tractor and trailer, spring means operable in a release position to brake said vehicle in an emergency condition and a second chamber operable by said source under supply pressure to maintain said spring means in a compressed inoperable manner under normal operating conditions;
   trailer valve means on said trailer including first and second brake lines and a relay valve, said trailer valve means operable in a normal position by fluid under supply pressure in said first line to communicate fluid in said second line under signal pressure to said trailer brake actuators and automatically shifted to an emergency position upon sensing a drop in pressure of said fluid in said first line to actuate said trailer brake actuators;
   a manually operable park valve on said tractor having an inlet connected to said source under supply pressure, an outlet and a vent, said park valve having a released position communicating its inlet with its outlet and an applied position communicating its outlet with its vent effective to actuate said spring means;
   control valve means including a control valve on said tractor having a first inlet in communication with said source under supply pressure, a second inlet in communication with said outlet of said park valve, and at least a first outlet, said control valve means manually operable to a fill position when said park valve is in its applied position to communicate said first inlet with said first outlet of said control valve;
   automatic valve means on said tractor in fluid communication with said outlet of said control valve and in fluid communication with said trailer valve means, said automatic valve means operable when said park valve is in its applied position and said control valve means is in its fill position to port fluid under supply pressure to both said first and second brake lines of said trailer valve means whereby said trailer brake actuators are actuated while said first line may be adapted to simultaneously operate said associated devices; and
   said trailer valve means includes a first reservoir, said relay valve associated with said first reservoir and in communication with said second chamber of said actuator and said first brake line, a second reservoir and an antilock valve associated with said second reservoir and in fluid communication with said second brake line and said first chamber of said actuator, said trailer valve means further operable with said control valve means in said fill position and said park valve in said applied position to maintain said trailer brake actuators in a fully actuated position while said trailer reservoirs are being pressurized with fluid at supply pressure.

2. The brake system of claim 1 wherein:
   a supply pressure line is in fluid communication with said park valve outlet and said second chamber of said tractor actuators;
   said control valve means in its normal operating position communicating said second inlet with said first outlet of said control valve and automatically shifted from said fill position to said normal position when said park valve is placed in its released position to vent said second brake line;
   said automatic valve means includes
      a two-position tractor protector valve, said tractor protector valve having a first outlet in fluid communication with said second brake line of said trailer valve means, a second outlet in fluid communication with said first brake line of said trailer valve means, a first inlet in fluid communication with said source of fluid at signal pressure and a second inlet in fluid communication with said source of fluid at supply pressure, and a pilot inlet in fluid communication with said outlet of said control valve and operable by fluid under supply pressure to bias said tractor valve to a first position to communicate said first inlet of said tractor protector valve with said first outlet of said tractor protector valve and said second inlet of said tractor protector valve with said second outlet of said tractor protector valve.
      a normally open/pilot closed valve having a pilot inlet in fluid communication with said outlet of said park valve, a main inlet in fluid communication with said outlet of said control valve, and an outlet vented to atmosphere, said normally open/pilot closed valve porting fluid under supply pressure when said valve is open, and
      a two-way check valve having a first inlet in fluid communication with said outlet of said normally open/pilot closed valve, a second inlet in fluid communication with said source of fluid at signal pressure and an outlet in fluid communication with said first inlet of said tractor protector valve.

3. A vehicle brake system for braking a tractor coupled to a towed trailer by means of a source of fluid supplied to said system under supply and variable signal pressures, said trailer adapted to be equipped with associated, fluid-operated devices, said system comprising:

a plurality of spring-set brake actuators on said tractor, each actuator having a first chamber operable by said source under signal pressure to normally brake said tractor and trailer, spring means operable in a release position to brake said vehicle in an emergency condition and a second chamber operable by said source under supply pressure to maintain said spring means in a compressed inoperable manner under normal operating conditons;

a plurality of brake actuators on said trailer, each trailer actuator having a service brake chamber effective to actuate said trailer actuator when suppiled with said source of fluid;

trailer valve means on said trailer including first and second brake lines and a relay valve, said trailer valve means operable in a normal position by fluid under supply pressure in said first line to communicate fluid in said second line under signal pressure to said trailer brake actuators and automatically shifted to an emergency position upon sensing a drop in pressure of said fluid in said first line to actuate said trailer brake actuators;

a manually operable park valve on said tractor having an inlet connected to said source under supply pressure, an outlet and a vent, said park valve having a released position communicating its inlet with its outlet and an applied position communicating its outlet with its vent effective to actuate said spring means and shift said trailer valve means to its emergency position;

control valve means including a control valve on said tractor having a first inlet in communication with said source under supply pressure, a second inlet in communication with said outlet of said park valve, and at least a first outlet, said control valve means manually operable to a fill position when said park valve is in its applied position to communicate said first inlet with said first outlet of said control valve;

automatic valve means on said tractor in fluid communication with said outlet of said control valve and in fluid communication with said trailer valve means, said automatic valve means operable when said park valve is in its applied position and said control valve means is in its fill position to port fluid under supply pressure to both said first and second brake lines of said trailer valve means whereby said trailer brake actuators are actuated while said first line may be adapted to simultaneously operate said assocaited devices; and said control valve means automatically disengages from said fill position when said park valve is manually operated to said release position, and said automatic valve means responds to said movements of said park valve and said control valve means to vent fluid at supply pressure from said second brake line.

* * * * *